Figure 1:
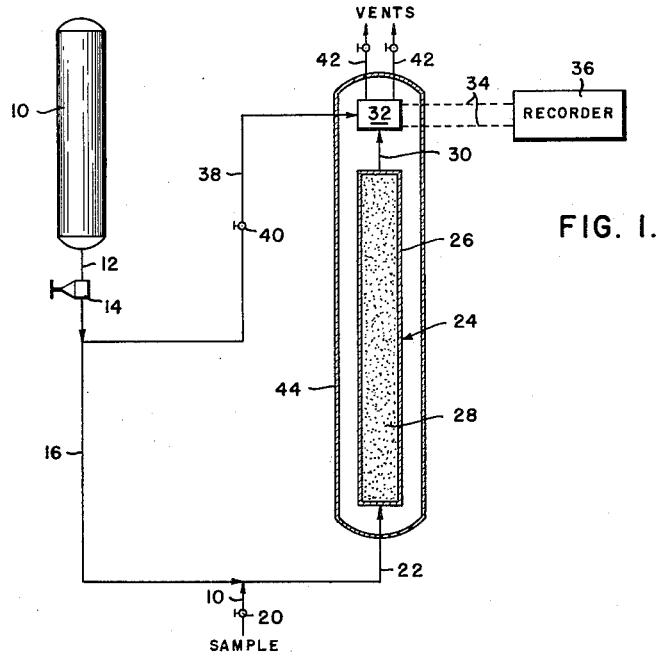

Aug. 7, 1962   W. C. JONES, JR   3,047,992
CHROMATOGRAPHIC ANALYSIS
Filed Aug. 18, 1958   3 Sheets-Sheet 1

INVENTOR.
WILLIAM C. JONES, JR.,
BY
ATTORNEY.

INVENTOR.
WILLIAM C. JONES, JR.,
BY Carl G. Ries
ATTORNEY.

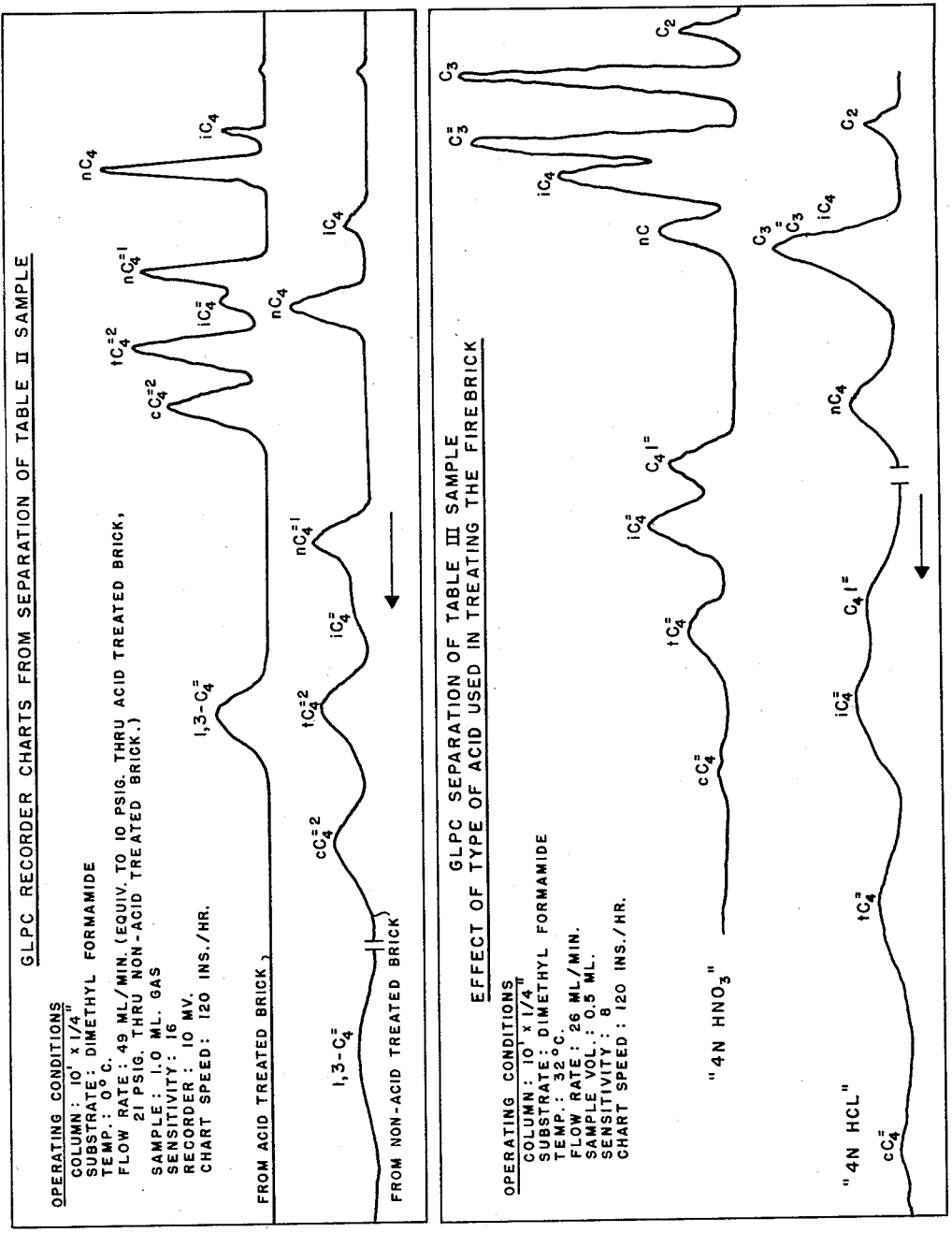

3,047,992
CHROMATOGRAPHIC ANALYSIS
William C. Jones, Jr., Baytown, Tex., assignor, by mesne assignments, to Esso Research and Engineering Company, Elizabeth, N.J., a corporation of Delaware
Filed Aug. 18, 1958, Ser. No. 755,686
3 Claims. (Cl. 55—67)

This invention relates to chromatographic analysis. More particularly, this invention relates to an improved chromatographic apparatus and an improved method for conducting chromatographic analyses.

Partition chromatographic analyses are conducted by placing in an elongate column a finely divided solid material (commonly referred to as a substrate support) which has been impregnated with a suitable normally liquid or solid partitioning agent (commonly referred to as the substrate). A fluent carrier is continuously passed through the thus-prepared column and a sample of a fluent material to be analyzed is thereafter injected into the carrier whereby the sample is resolved into its component parts as it floats through the chromatographic column and whereby the individual components of the sample may be detected in any suitable manner.

It is known to the art that the efficiency of separation of the sample that is obtained in the chromatographic column is, in part, a function of the chemical nature of the substrate and, accordingly, the substrate to be utilized in a particular situation will be selected with due regard to the sample material to be analyzed.

It has now been discovered that surprising improvements in partition chromatographic analysis are obtainable through the provision of a new and improved substrate support. The substrate support of the present invention is prepared by treating the so-called "fire-brick" of commerce (a brick prepared by the calcining of diatomaceous earth) with nitric acid having a normality of at least 4. As an example, the improved substrate support of the present invention may be prepared by the nitric acid treatment of a fire-brick obtained by the calcining at a temperature within the range of about 1800° F. to 1950° F. of the diatomaceous earth obtained from the Lompoc, California, deposit of diatomaceous earth and similar deposits. A fire-brick of this nature is crushed and sieved so as to provide particles of a desired size (e.g., 40 to 60 mesh). The thus-obtained particles of fire-brick are slurried in an aqueous solution of nitric acid having a normality of at least 4 in the form of a thin slurry in order to wet all of the particles. Excess liquid is immediately removed from the slurry and the wet acid-treated particles are thereafter heated at a temperature within the range of about 25° to 212° F. in order to substantially completely remove the nitric acid utilized for the treating step.

In order to prepare a material for utilization in a chromatographic column, the thus-prepared substrate support is impregnated with a substrate. This may be done in any desired manner. For example, from about 30 to 50 weight percent of a desired substrate (based on the weight of the substrate support) is dissolved in a highly volatile solvent such as anesthetic ether. The thus-prepared solution of substrate is admixed with the acid-treated substrate support in order to thoroughly impregnate the support with the solution. Thereafter, the highly volatile solution is driven from the slurry in an inert atmosphere.

The thus-prepared material consisting of the substrate support impregnated with the substrate is thereafter placed in a suitable chromatographic column in accordance with known techniques.

Figure 5:
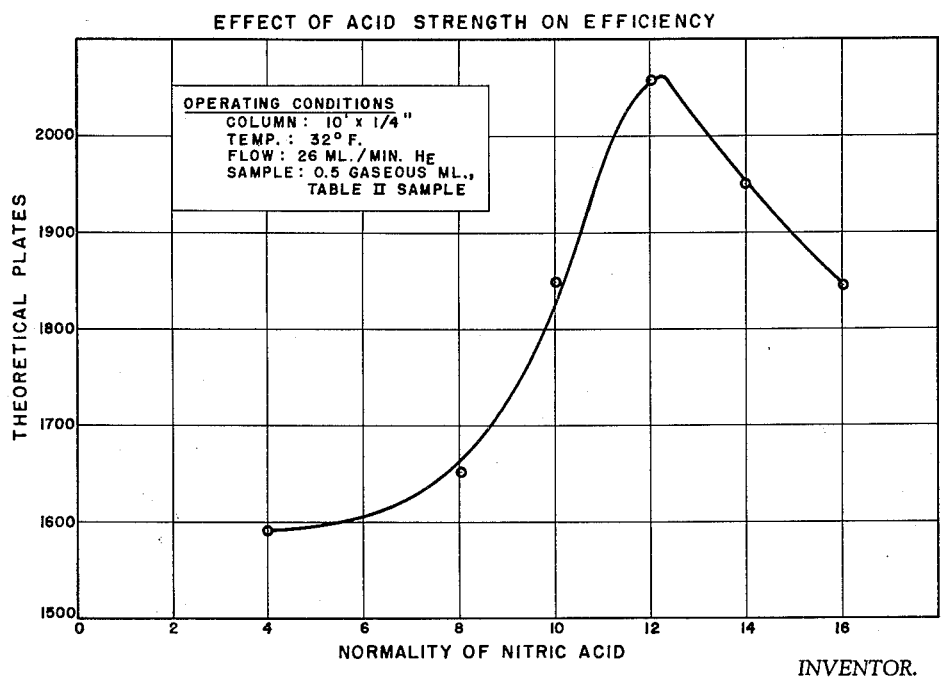
Figure 2:
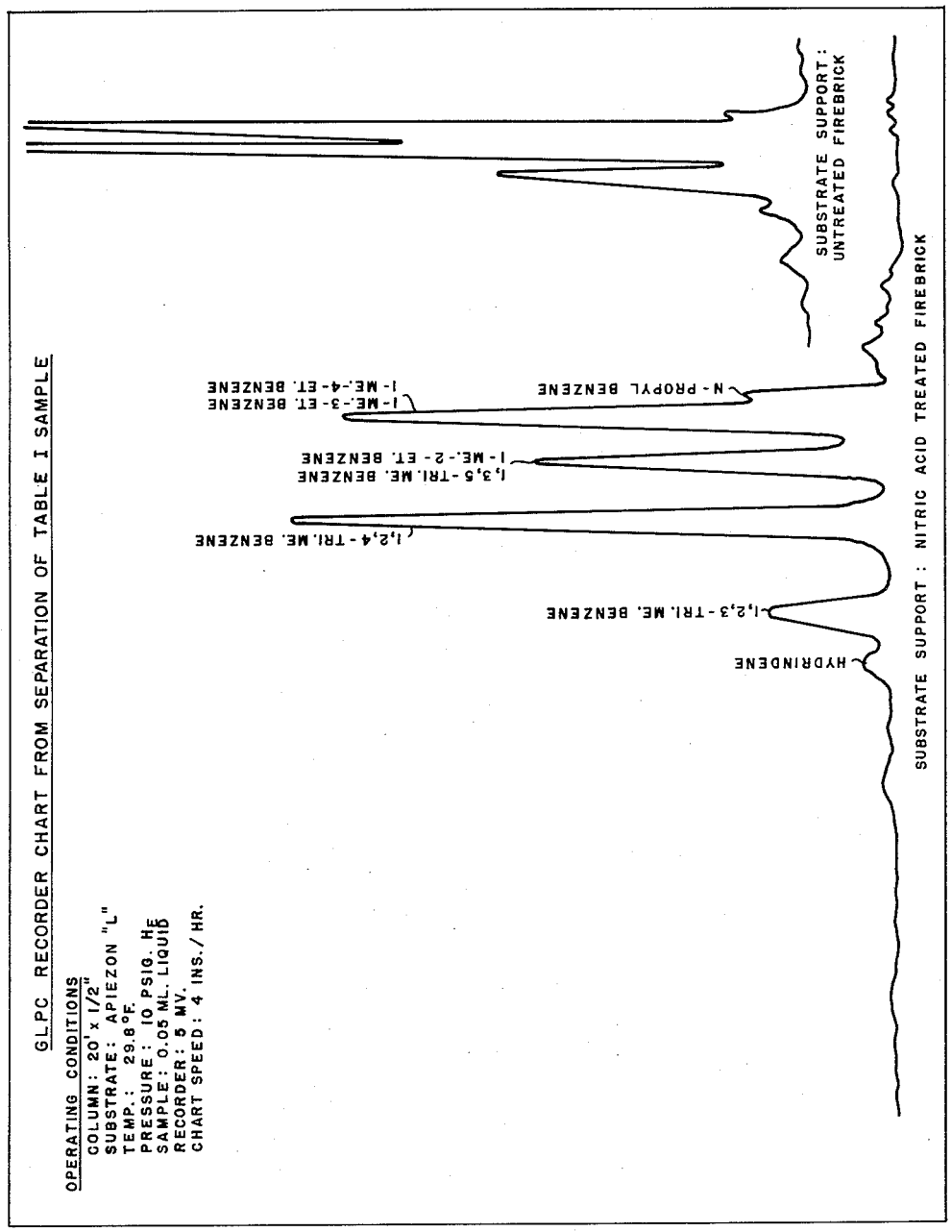

The invention will be further illustrated with reference to the accompanying drawings wherein:

FIG. 1 is a schematic elevational view, partially in section, of a chromatographic device of the present invention;

FIGS. 2, 3, and 4 are reproductions of representative strip chart recordings; and FIG. 5 is a graph illustrating the effect of nitric acid normality on chromatographic efficiency.

Turning now to FIG. 1, a suitable container 10 is provided for a suitable gaseous or liquid carrier, the container 10 being provided with a line 12 controlled by a suitable flow regulator 14 leading to a line 16. Admitted into line 16 by way of a line 18 controlled by a valve 20 is a portion of a suitable sample to be analyzed. The resultant mixture of carrier and sample is then flowed by way of a line 22 into a chromatographic column designated generally by the numeral 24. The chromatographic column 24 comprises a tubular casing 26 having as a packing therein a finely divided substrate 28 impregnated with a suitable substrate support (hereinafter referred to as packing 28). The packing 28 resolves the sample into its component parts and such component parts flow sequentially from the column 24 by way of a line 30 into a thermal conductivity shell 32 which, by differences in thermal conductivity, indicates the presence and amounts of the various components. A signal is conducted from the shell 32 by way of electrical leads 34 into a recorder 36 of any suitable construction, but which is preferably a strip chart recorder of the type which draws a graph showing the portions of the various components in the effluent flowing by way of line 30 into the shell 32.

A portion of the carrier in the line 16 may suitably be passed by way of a line 38 controlled by a valve 40 into the shell 32 and outwardly therefrom by way of valve control vents 42 along with effluent gases from the line 30.

The assembly, including the column 24 and the thermal conductivity shell 32, is suitably housed in a jacket 44 which maintains the temperature of the column at a desired constant level.

The invention will be further illustrated with reference to the following specific examples which are given by way of illustration and not as limitations on the scope of this invention.

EXAMPLE I

*Preparation of Substrate Supports*

In conducting the following described experiments, a variety of substrate supports were utilized. The so-called "untreated" fire-brick support was prepared by crushing and sieving fire-brick from the above-identified Lompoc, California, deposit and by sieving of the crushed fire-brick to provide particles substantially exclusively within the 40 to 60 mesh range.

The acid-treated substrate supports were prepared by slurrying crushed and sieved fire-brick in an aqueous solution of a desired acid having the desired normality and by thereafter removing acid and water from the treated substrate support.

The subtrate supports prepared by the above-described procedures were impregnated with about 40 weight percent of a desired substrate in the above-described manner. That is, the substrate was completely dissolved in anesthetic ether and the ether solution was thereafter utilized to impregnate the dry substrate support. Ether was thereafter volatilized in an inert atmosphere to provide a material consisting essentially of substrate support impregnated with substrate.

EXAMPLE II

Nitric Acid Fire-Brick Is Superior to Untreated Fire-Brick

In a first series of experiments, an untreated fire-brick support and a fire-brick support prepared by treatment with 4-N nitric acid were each impregnated with a fraction of a hydrocarbon residuum fraction known as "Apiezon L." Thereafter, an aromatics sample having the composition set forth in Table I was subjected to analysis in chromatographic units packed with the two thus-prepared packing materials under standardized operating conditions, the carrier gas in this situation being helium.

TABLE I

| | Concentration, liq. vol. percent |
|---|---|
| $C_6$ non-aromatics | 0.7 |
| Benzene | 0.3 |
| Toluene | 0.1 |
| m-p-Xylene | 0.3 |
| o-Xylene | 0.7 |
| $C_8$ non-aromatics | 0.4 |
| Ethylbenzene | 0.7 |
| Isopropylbenzene | 1.3 |
| $C_9$ non-aromatics | 1.0 |
| m-Propylbenzene | 6.5 |
| 1-methyl-3 ethylbenzene and 1-methyl-4 ethylbenzene | 24.8 |
| 1,3,5-tetramethylbenzene and 1-methyl-2 ethylbenzene | 17.3 |
| 1,2,4-tetramethylbenzene | 32.4 |
| 1,2,3-tetramethylbenzene | 8.7 |
| Hydrindene | 2.7 |
| $C_{10}$ non-aromatics | 2.1 |

From FIG. 2 it will be observed that the reference subtrate support (not acid treated) interfered with the chromatographic analysis so that an accurate determination of the sample was not possible. However, with the substrate support of the present invention, an accurate and meaningful analysis was obtained.

EXAMPLE III

As a further example of the need for acid treatment in accordance with the present invention, chromatographic columns were prepared containing as a packing a desired substrate support impregnated with dimethyl formamide. The subtrate supports were the substrate supports of Example II (non-acid treated and 4-N nitric acid treated crushed fire-brick). The sample had the composition set forth in Table II.

TABLE II

| Component: | Concentration, liq. vol. percent |
|---|---|
| n-Butane | 15.20 |
| Isobutane | 3.67 |
| n-Butene-1 | 16.95 |
| Isobutene | 7.04 |
| Trans-butene-2 | 22.00 |
| Cis-butene-2 | 18.46 |
| 1,3-butadiene | 16.69 |

From FIG. 3, it will be observed that an unsatisfactory analysis was obtained with the reference column containing untreated crushed fire-brick in that there was an incomplete resolution with respect to the normal- and isobutenes and in that widely spaced, poorly defined peaks were formed by the strip chart recorder. In contrast, well-separated, sharply defined peaks were obtained through the utilization of the substrate support of the present invention.

EXAMPLE IV

The Improved Results Are Obtained Only With Nitric Acid

As a further example of the present invention, substrate supports were obtained by treating the crushed fire-brick with 4-N nitric acid in accordance with the present invention and the 4-N hydrochloric acid. The acid treated supports were impregnated with dimethyl formamide as a substrate in accordance with the above-described procedure. Thereafter, samples having the known compositions set forth in Table III were subjected to analysis in columns containing the two packings under standardized conditions with the results that are set forth in FIG. 4.

TABLE III

| Component: | Concentration, wt. percent |
|---|---|
| Ethane | 2.32 |
| Propane | 13.67 |
| Propylene | 13.84 |
| Isobutane | 21.36 |
| n-Butane | 8.94 |
| Butene-1 | 9.98 |
| Isobutene | 15.20 |
| Trans-butene-2 | ---- |
| Cis-butene-2 | 12.06 |
| Isopentane | 1.33 |
| Pentene-1 | 0.70 |
| Pentene-2 | 0.60 |

It is to be noted from FIG. 4 that an unsatisfactory result was obtained with the hydrochloric acid-treated fire-brick.

EXAMPLE V

As a further illustration of the present invention, samples of crushed fire-brick were treated with aqueous solutions of nitric acid having varying degrees of normality. The acid-treated supports were thereafter impregnated with dimethyl formamide. Columns packed with packing materials prepared in the above-described fashion were thereafter utilized to analyze samples of the sample materials of Table II, supra. From the results obtained the number of theoretical plates obtained with each packing was determined. The results are graphically set forth in FIG. 5 and also in Table IV.

TABLE IV

Effect of Acid Strength on Efficiency of Firebrick [1] Used in GLPC

| | Normality of nitric acid | | | | | |
|---|---|---|---|---|---|---|
| | 4 N | 8 N | 10 N | 12 N | 14 N | 16 N |
| Substrate liquid | [2] DMF | [2] DMF | [2] DMF | [2] DMF | [2] DMF | [2] DMF |
| Column dimensions | [3] | [3] | [3] | [3] | [3] | [3] |
| Temp., °F | 32 | 32 | 32 | 32 | 32 | 32 |
| Flow rate, ml./min | 26 | 26 | 26 | 26 | 26 | 26 |
| Sample chromatographed | [4] | [4] | [4] | [4] | [4] | [4] |
| Sample volume, ml. gas | 0.5 | 0.5 | 0.5 | 0.5 | 0.5 | 0.5 |
| Theoretical plates [5] | 1590 | 1651 | 1847 | 2060 | 1950 | 1845 |

[1] 40–60 mesh.
[2] Dimethyl formamide.
[3] 10′ x ¼″.
[4] Table II.
[5] As per reference, Littlewood, A. B., Phillips, C.S.G., and Price, D. T., J. Chem. Soc. 1480 (May 1955).

EXAMPLE VI

As a still further illustration of the present invention, the number of theoretical plates obtainable with other substrates and other samples were calculated from analyses conducted in the manner tabularly set forth in Table V with the results there noted.

TABLE V

*Effect of Acid Strength on Efficiency of Firebrick [1] Used in GLPC*

|  | Normality of nitric acid | | | |
|---|---|---|---|---|
|  | 4 N | 8 N | 12 N | 16 N |
| Substrate liquid | Octoil | Octoil | Octoil | Octoil |
| Column dimensions | ([2]) | ([2]) | ([2]) | ([2]) |
| Temp., °F | 80 | 80 | 80 | 80 |
| Flow rate, ml./min | 20 | 20 | 20 | 20 |
| Sample chromatographed | ([3]) | ([3]) | ([3]) | ([3]) |
| Sample volume, ml. gas | 0.15 | 0.15 | 0.15 | 0.15 |
| Theoretical plates [4] | 662 | 681 | 683 | 700 |

|  | Normality of nitric acid | |
|---|---|---|
|  | 4 N | 12 N |
| Substrate liquid | ([5]) | ([5]) |
| Column dimensions | ([6]) | ([6]) |
| Temp., °F | 297 | 297 |
| Flow rate, ml./min | 100 | 100 |
| Sample chromatographed | ([7]) | ([7]) |
| Sample volume, liq. ml | 0.03 | 0.05 |
| Theoretical plates [4] | 3069 | 3181 |

[1] 40–60 mesh.
[2] 10' x ¼".
[3] Table III.
[4] As per reference, Littlewood, A. B., Phillips, C.S.G., and Price, D. T., J. Chem. Soc. 1480 (May 1955).
[5] Apiezon "L."
[6] 20' x ½".
[7] Table I.

From Tables IV and V and FIG. 5, it will be observed that the normality of the nitric acid had a significant effect with respect to the number of theoretical plates obtainable under the standardized analysis conditions.

Having described my invention, what is claimed is:

1. In a chromatographic separation, the improvement which comprises utilizing as a substrate support a firebrick material having been treated with nitric acid having a strength of about 12 N and utilizing dimethyl formamide as a substrate.

2. A method for conducting a chromatographic separation which comprises the steps of flowing a fluent carrier in admixture with a charge sample of material to be separated through a chromatographic column containing as a substrate support a crushed firebrick material which has been treated with nitric acid of about 12 N concentration, and as a substrate dimethyl formamide, and removing the admixture from the chromatographic column, whereby the constituent compounds in the sample material are separated.

3. A method in accordance with claim 2 wherein the sample mixture comprises normally gaseous hydrocarbons.

References Cited in the file of this patent

UNITED STATES PATENTS

| 2,701,240 | Bregar | Feb. 1, 1955 |
| 2,875,849 | Edwards et al. | Mar. 3, 1959 |

OTHER REFERENCES

Articles: The Chromatography of Gases and Vapors, by Littlewood et al., published in Journal Chemical Society, No. 2, 1955, pages 1480–1483.

Book: Vapor Phase Chromatography, by Desty, Butterworth's Scientific Publication, London, 1956, pages XI, XII. (Copy in Patent Office Library.)